United States Patent [19]

Nakamura et al.

[11] Patent Number: 4,866,646

[45] Date of Patent: Sep. 12, 1989

[54] HANDHELD DATA INPUT APPARATUS

[75] Inventors: Yoshikathu Nakamura, Yokosuka; Katsunori Ooi, Yokohama; Koji Yura, Kawasaki, all of Japan

[73] Assignee: Kabushiki Kaisha Toshiba, Kawasaki, Japan

[21] Appl. No.: 52,389

[22] Filed: May 21, 1987

[30] Foreign Application Priority Data

May 26, 1986 [JP] Japan ................... 61-120899

[51] Int. Cl.$^4$ .............................................. G06F 15/00
[52] U.S. Cl. ............................................. 364/709.11
[58] Field of Search ................ 382/13, 59; 364/70, 364/9.01, 900 MS File, 709.11; 381/51

[56] References Cited

U.S. PATENT DOCUMENTS

| 4,360,716 | 11/1982 | Fiorella ................... 364/709 |
| 4,542,526 | 9/1985 | Satoh et al. ................. 382/13 |
| 4,641,354 | 2/1987 | Fukunaga et al. ............ 382/13 |
| 4,722,065 | 1/1988 | Ogawa .................... 364/709 |

Primary Examiner—Gary V. Harkcom
Assistant Examiner—Long T. Nguyen
Attorney, Agent, or Firm—Oblon, Spivak, McClelland, Maier & Neustadt

[57] ABSTRACT

In the data input apparatus, a pressure-sensitive tablet, a character recognition section for recognizing handwritten character data input through the tablet, a document memory for sequentially storing a recognition result of the character data, and a power supply for driving the tablet, the recognition control section, and the document memory, are integrally incorporated in a handheld casing. The data input apparatus can be detachabably connected to a document processing apparatus main body via a cable. During an input operation, the data input apparatus is disconnected from the data processing apparatus main body, and performs the input operation independently of the main body, to store the input document data in the document memory. The data input apparatus is connected to the document data processing apparatus, and the document data stored in the document memory is sent to the main body to be processed.

32 Claims, 8 Drawing Sheets

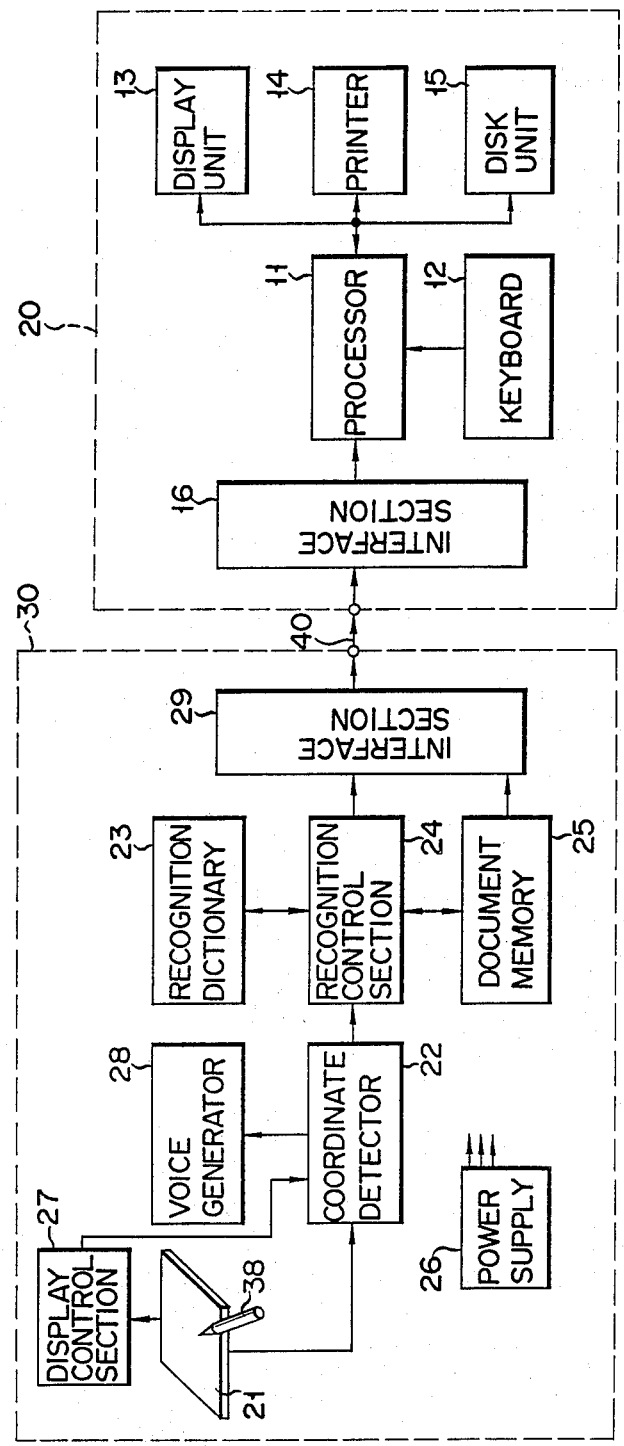
F I G. 2

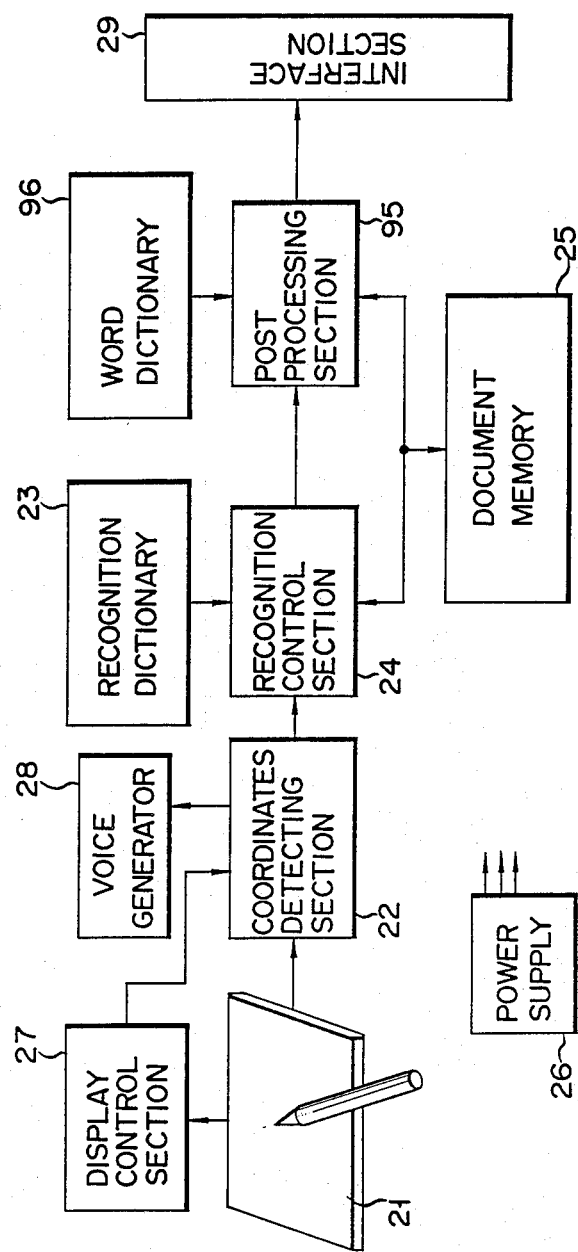
F I G. 12

HANDHELD DATA INPUT APPARATUS

BACKGROUND OF THE INVENTION

The present invention relates to a handheld data input apparatus for inputting handwritten character data.

In recent years, document processing utilizing a data processing system such as a wordprocessor has become increasingly popular. The number of business applications for such a document processing system tends to increase along with the development of office automation.

In the document processing system, some attempts have been made to input handwritten character data by use of a coordinate input apparatus such as a tablet apparatus, in place of character data input by means of a keyboard FIG. 1 is a block diagram of a conventional document processing system. This document processing system comprises tablet 1 and document processing apparatus main body 2 connected to tablet 1.

Document processing apparatus main body 2 has coordinate detecting section 3. Coordinate detecting section 3 detects coordinate positions of character patterns written/input via tablet 1. The detected time-serial coordinate positions, i.e., the trace of the handwritten character pattern is supplied to character recognizing section 5. Section 5 recognizes the input dictionary based on the trace of the supplied handwritten character pattern. The input character data recognized by section 5 is stored in document memory section 6. Word processing section 7 reads out the input character data from memory section 6 and performs document processing such as kana-kanji conversion. Section 7 receives, through keyboard 8, control data indicating a type of document processing to be performed, in addition to document data. Data which is subjected to document processing in section 7 is again stored in memory section 6, and is displayed on display unit 9 or printed out by printer 10.

The document processing system having a character recognition function with respect to a handwritten input character does not require a special knowledge or skill for operating its keyboard, in comparison with a document processing system which comprises only a keyboard. Therefore, this system is superior, with regard to the data input operation by means of a keyboard, in that any one can use this system without the need to have specialized knowledge.

In the conventional document processing system having a tablet, keyboard 8 and tablet 1 are connected to the document processing apparatus main body, so as not to be detached therefrom. With the document processing system being installed in a specific fixed location, an operator must therefore go to this location each time he/she wishes to perform an input operation.

The input processing speed of the handwritten-character input operation is lower than that of a character input operation by means of a keyboard. For this reason, in an environment where a large volume of document data is to be processed, document writers produce documents on paper sheets by means of handwriting. Then, skilled operators input the document contents via a keyboard. For this reason, the bulk of the document data input operation is concentrated on the operators.

However, since the tablet and the keyboard are integrally arranged with the document processing apparatus main body as in the current system, the operators must in turn input documents.

Consequently, demand has increased for a low-cost document processing system which can shorten the processing time without imposing a heavy workload on the writers and operators.

SUMMARY OF THE INVENTION

It is an object of the present invention to provide a data input apparatus which can shorten the processing time without imposing a heavy workload on writers and operators, while maintaining a low-cost advantage.

In order to achieve the above object, an input apparatus of the present invention comprises: a pressure-sensitive tablet; a character recognition section for recognizing handwritten character data input through the tablet; a document memory, connected to the character recognition section, for storing a recognition result from the character recognition section; a power supply section for supplying power to the tablet, the document recognition section, and the document memory; and a casing integrally incorporating the tablet, the document recognition section, the document memory, and the power supply section.

According to the data input apparatus of the present invention, an input apparatus, for example, a tablet, is separated from a document processing system, and a plurality of tablets commonly use a single document processing apparatus main body. Therefore, processing performance equivalent to a plurality of document processing systems can be obtained even if a plurality of document processing systems are not installed. Since a writer can handwrite on a tablet in place of a paper sheet, one of two input operations, i.e., a handwriting operation onto a paper sheet and an input operation by means of a keyboard, can be omitted, and the processing time can be shortened, while maintaining low costs and without imposing a heavy workload on the writers.

BRIEF DESCRIPTION OF THE DRAWINGS

Other objects and features of the present invention will be apparent from the following description taken in connection with the accompanied drawings in which:

FIG. 2 is a block diagram showing an embodiment of a document processing system combining a data input apparatus of the present invention and a document processing apparatus main body;

FIG. 12 is a block diagram showing another embodiment of the present invention.

DETAILED DESCRIPTION OF THE PREFERRED EMBODIMENTS

Figure 1:
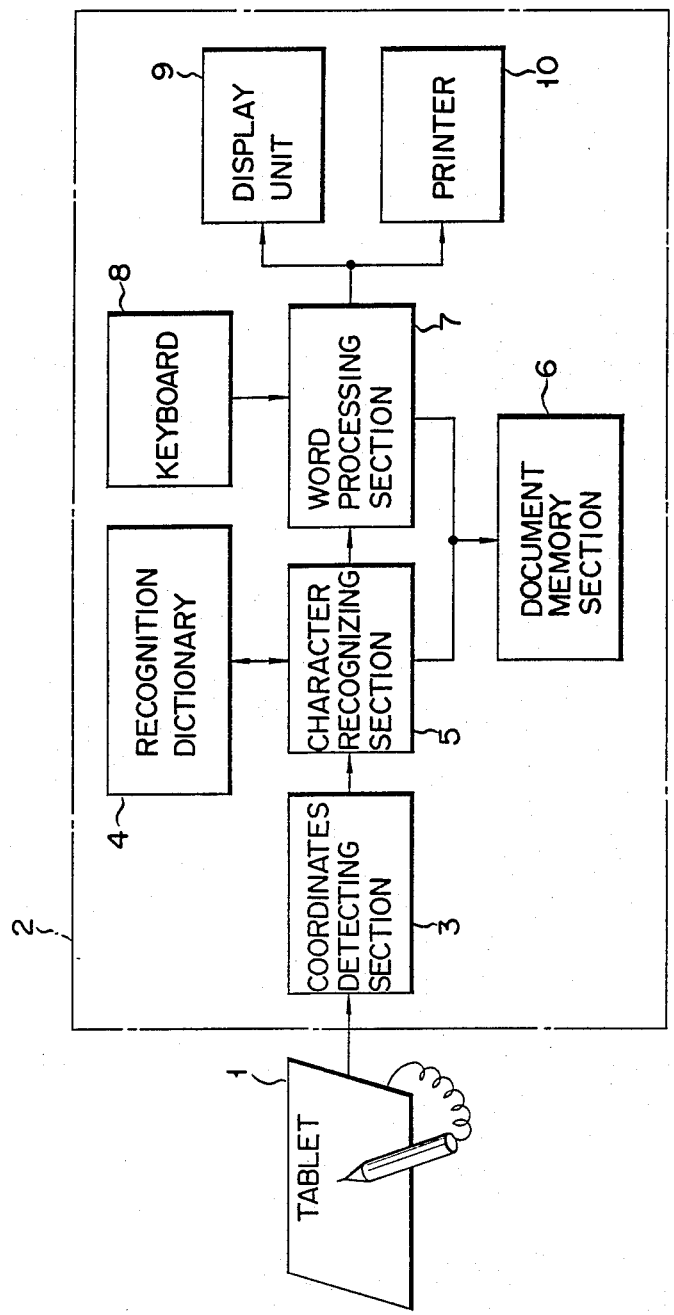
FIG. 1 is a block diagram showing the arrangement of a conventional document processing system.

In a document processing system shown in FIG. 2, data input apparatus 30 and document data processing apparatus main body 20 are connected to each other through interface sections 29 and 16 as needed. A plurality of data input apparatuses 30 can be connected to main body 20. Main body 20 comprises processor 11 for processing input document data, keyboard 12 for inputting document data and document processing control data to processor 11, display unit 13 for displaying document data which is to be subjected to document processing or is document-processed in processor 11, printer 14 for printing out the document data, disk unit 15 for storing document-processed document data, and interface section 16 for connecting with the data input apparatus, in the same manner as in the main part of the conventional document processing system.

Data input apparatus 30 has pressure sensitive tablet 21. A pressed coordinate position on tablet 21 is detected by coordinate detector 22. The time-serial coordinate positions detected by coordinate detector 22 form a trace of a handwritten character pattern. Recognition control section 24 extracts feature data from the trace of the handwritten input character pattern, and verifies the extracted data with feature data of a standard character pattern registered in recognition dictionary 23 to recognize the handwritten input character data and to output character code data. The character code data from recognition control section 24 is stored in document memory 25. Voice generator 28 is connected to coordinate detector 22, and comprises, e.g., a piezoelectric loudspeaker. Voice generator 28 outputs a sound of a frequency corresponding to a pressed position on a detection surface of tablet 21. In addition to this sound, a pen-up duration after a pressing state is released is measured to discriminate segmentations of a handwritten input character. When the duration exceeds a preset value, generator 28 generates a sound indicating a division of one character. This sound is produced at a frequency and as a voice output quite different from those of the sound indicating the pressed coordinate position of tablet 21, and can be distinguished from the former sound. Display control section 27 controls display of various kinds of data on a flat display consisting of a liquid-crystal display which is integrally stacked on tablet 21. Interface section 29 is adopted for connection with main body 20.

Figure 3:
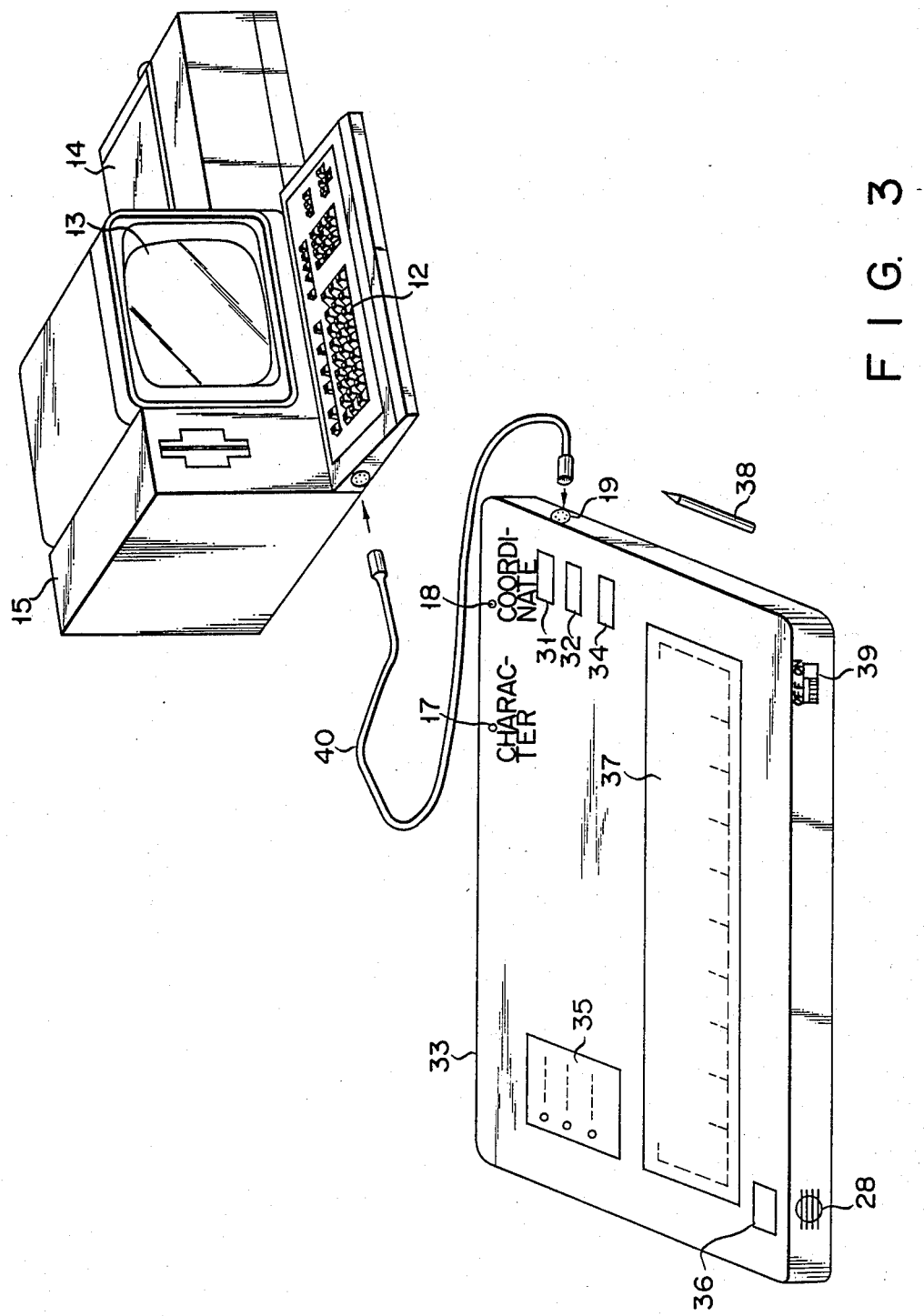
FIG. 3 is a perspective view showing an embodiment of the arrangement of the outer appearance of the data input apparatus of the present invention.

DC power supply 26 supplies DC power to tablet 21, coordinate detector 22, recognition control section 24, recognition dictionary 23, document memory 25, display control section 27, voice generator 28, and interface section 29. Data input apparatus 30 having the above arrangement is integrally installed in a handheld casing, as shown in FIG. 3. Data input apparatus 30 is connected to apparatus main body 20 through a signal cable such as an RS-232C, as needed. Tablet surface 37 is arranged on the upper surface of casing 33. Display unit 35 for displaying various messages, soft switch 36 for switching between character data output and coordinate data output, character data output indication lamp 17, coordinate data output indication lamp 18, insertion setting switch 31, deletion setting switch 32, correction setting switch 34, and the like are also arranged on the upper surface of casing 33. Voice generator 38 and power switch 39 for data input apparatus 30 are arranged on the side surface of casing 33. In addition, a power supply connecting terminal (not shown) for charging DC power supply 26, and signal cable connecting terminal 19 for connecting apparatus 30 to main body 20 are provided to casing 33.

Data input apparatus 30 with the above arrangement recognizes individual handwritten input character data through tablet 21 independently of main body 20, and sequentially stores the recognition results in document memory 25 to accumulate input document data. When apparatus 30 is connected to main body 20 through cable 40, input document data stored in document memory 25 is supplied to main body 20 and is subjected to document processing.

Apparatus 30 described above performs only input processing of document data independently of main body 20. When apparatus 30 is connected to main body 20 through signal cable 40, it can transfer document data stored in document memory 25 to main body 20.

The arrangements of the respective parts of the data input apparatus will now be described in more detail.

Figure 4:
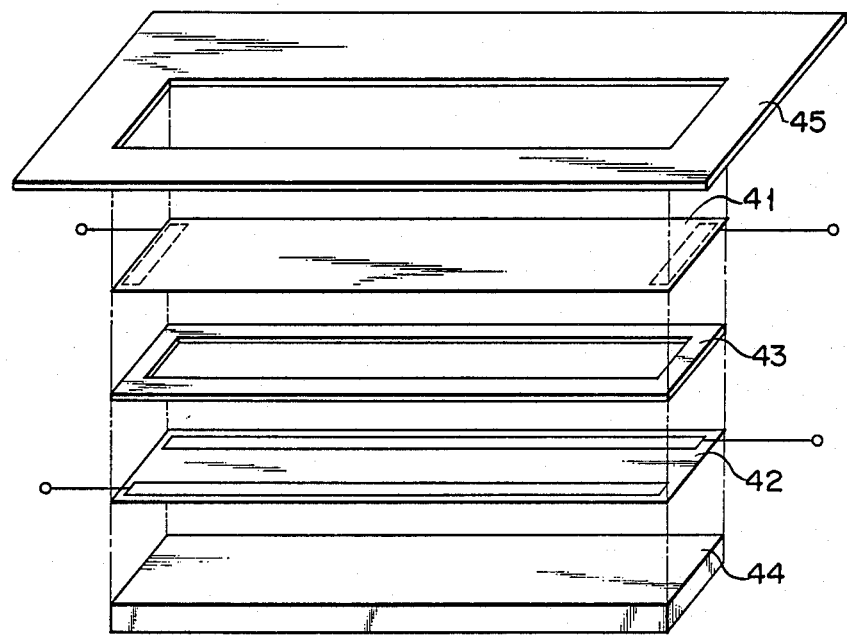
FIG. 4 is an exploded perspective view showing a schematic arrangement of a pressure sensitive tablet of the present invention.

As shown in FIG. 4, tablet 21 has a pressure sensitive tablet mechanism which is constituted by integrally stacking upper film 41, lower film 42, and spacer 43. Upper film 41 has a transparent polymer material such as polyethylene as a base, a transparent resistor film deposited on the lower surface of the base, and conductive electrodes arranged on the two edge portions of the lower surface in its longitudinal direction (X direction). Lower film 42 also has a polymer material as a base, a transparent resistor film uniformly deposited on the upper surface of the base, and conductive electrodes arranged on two edge portions of the upper surface in its transverse direction (Y direction). Spacer 43 is sandwiched between upper and lower films 41 and 42 to separate them at a proper gap. Constituting members of the pressure sensitive tablet mechanism are selected to allow the mechanism to be transparent as a whole. Theoretically, the above structure can achieve the object of coordinate input. However, in practice, a transparent protective sheet is interposed between upper film 41 and top plate 45 (to be described later) in order to withstand slide movement upon handwriting input.

In pressure sensitive table 21, flat liquid-crystal display 44 is integrally stacked on the lower surface of the pressure sensitive tablet mechanism. An operator can read various kinds of data displayed on liquid-crystal display 44 through the pressure sensitive tablet mechanism since the pressure sensitive tablet mechanism is constituted by transparent materials. Top plate 45 is arranged on upper film 41.

When a pressing force of a pen locally acts in the vertical direction (thickness direction) of the pressure sensitive tablet mechanism, upper and lower films 41 and 42 are electrically connected to each other at the position.

Figure 5:
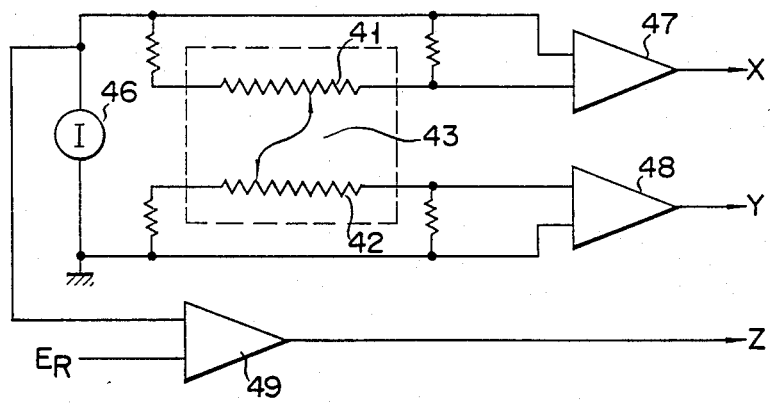
FIG. 5 is a detailed circuit diagram of a coordinate detector shown in FIG. 2.

FIG. 5 is a detailed circuit diagram of coordinate detector 22. Coordinate detector 22 causes constant current source 46 to apply a predetermined voltage in the X and Y directions to upper and lower films 41 and 42, respectively. When upper and lower films 41 and 42 are locally electrically connected to each other by a pen pressure, current values across conductive electrodes of upper and lower films 41 and 42 are detected in the X and Y directions through differential amplifiers 47 and 48, respectively, and the detected current values are obtained as positional data corresponding to X and Y coordinates.

At the same time, coordinate detector 22 detects a voltage across constant current source 46 to detect a pen up or down with respect to the tablet mechanism. Detected positional data in the X and Y directions are fetched in accordance with the detected pen up or down, thereby obtaining data representing a handwriting of an input character pattern on the tablet as detected time-serial coordinate positions.

The size of each display pixel and a pixel density of liquid-crystal display 44 integrally stacked on the pressure sensitive tablet mechanism of tablet 21 are substantially the same as a precision for detecting coordinate positions by means of the pressure sensitive tablet mechanism. Therefore, tablet 21 is designed so that an input coordinate system by the pressure sensitive tablet mechanism coincides with an output (display) coordinate system by liquid-crystal display 44. Data of a handwritten character input area, e.g., a character input frame, a scale indicating a character input position, and the like are displayed on display 44, as will be described later. The handwriting data of a character pattern input through the pressure sensitive tablet mechanism is sequentially displayed on display 44 in a real time manner in the same coordinate system.

Figure 6:
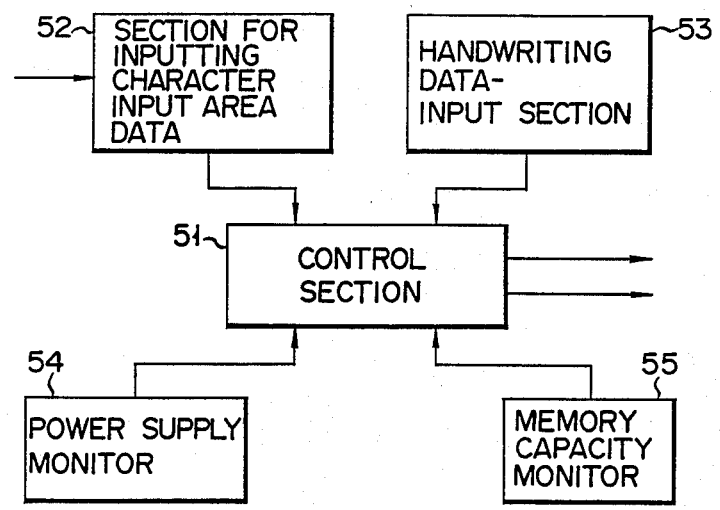
FIG. 6 is a detailed block diagram of a display control section shown in FIG. 2.

FIG. 6 is a detailed block diagram of display control section 27 for controlling display data on liquid-crystal display 44 and display unit 35 for displaying messages. Display control section 27 comprises control section 51, character input area data input section 52, handwriting data input section 53, power supply monitor 54, and memory capacity monitor 55.

Figure 7A:
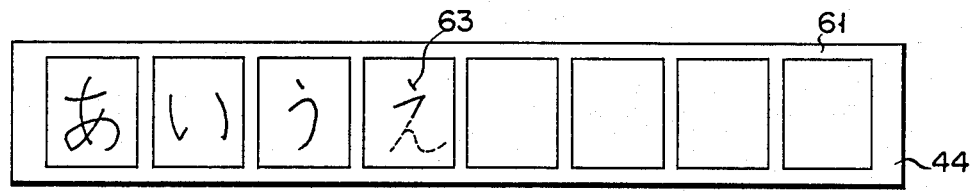
FIGS. 7A and 7B are representations showing character input areas of the tablet shown in FIG. 2.
Figure 7B:
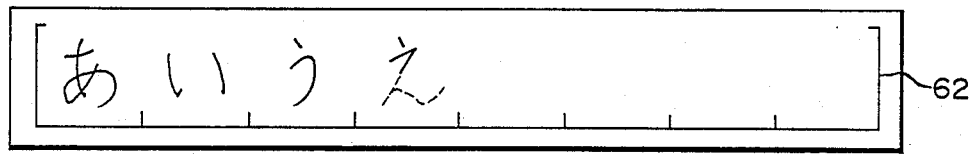

Character input area data input section 52 supplies, to control section 51, size data of a handwritten input character which is externally input and set, or prestored character size data if the size data is not externally input. Control section 51 receives the size data of a handwritten input character, and displays, on display 44, character frames 61 for specifying a character input area or scale 62 serving as a guide for a character input operation, as shown in FIGS. 7A and 7B. Character frames 61 or scale 62 can be visually confirmed through the transparent pressure sensitive tablet mechanism. A document writer handwrites characters in the character input areas specified by character frames 61 or scale 62 while visually confirming it through the transparent pressure sensitive tablet mechanism.

Handwriting data input section 53 displays handwriting data which is handwritten within the character input area in this manner and is detected by coordinate detector 22, as handwriting pattern 63 in real time, as shown in FIGS. 7A and 7B. Upon display of handwriting pattern 63, the writer can naturally handwrite character data as if he were writing characters on a paper sheet.

Recognition control section 24 extracts the handwritten input character data for each character input area, and recognizes it. The character recognition processing is performed by utilizing feature extraction processing of a handwritten character pattern and verification processing of the feature pattern and a recognition dictionary which are conventionally proposed.

When a character is to be recognized in this manner, a standard character pattern based on the character recognition result can be displayed in place of an input pattern from which the recognition result is derived. The operator can then easily recognize whether or not the handwritten input character data is recognized or whether or not the recognition result is correct.

When character data are handwritten on all the character input areas of the tablet mechanism, or when necessary character data are input, recognition data is input to store the character recognition results subjected to recognition processing in document memory 25, as described above. Display 44 is cleared to prepare for the next character data handwriting input operation.

Handwritten character data are sequentially input from tablet 21, and are stored in document memory 25.

Figure 8:
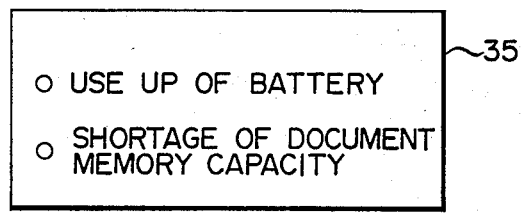
FIG. 8 is a representation showing a warning message in the tablet shown in FIG. 2.

Power supply monitor 54 monitors a power supply voltage of DC power supply 26 so as to detect a decrease in power supply voltage below a predetermined level. When the power supply voltage is decreased below the predetermined level, monitor 54 causes display unit 35 to display a message "USE UP OF BATTERY", as shown in FIG. 8. Upon this display, since the operator can charge DC power supply 26, a reliable input operation can be assured, and input character data can be reliably stored in document memory 25.

Memory capacity monitor 55 monitors a volume of input character data stored in document memory 25. When the available capacity of document memory 25 becomes small, monitor 55 displays a message "SHORTAGE OF DOCUMENT MEMORY CAPACITY". When this message is displayed, the writer connects apparatus 30 to main body 20 to temporarily transfer input document data to apparatus 20, and then restarts the document data input operation.

When an external memory, such as a floppy disk apparatus, is connected to apparatus 30, the input document data is temporarily transferred to the external memory, and so on.

Each time a given volume of document data is input to apparatus 30, input data transfer processing is performed in accordance with this message, and apparatus 30 can be repetitively and independently used as a document data processing apparatus.

The above warning messages are simultaneously displayed with a warning sound output by means of loudspeaker 38 described above, and hence, the operator can receive the visual and aural warnings.

Figure 9:
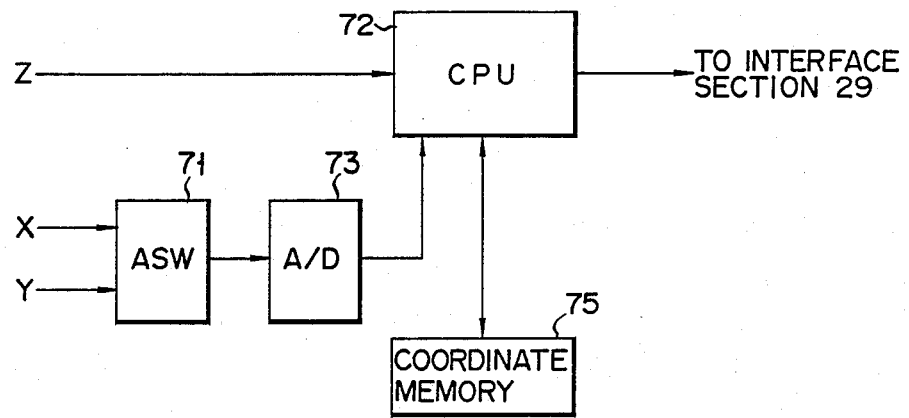
FIG. 9 is a detailed block diagram of a recognition control section shown in FIG. 2.

Recognition control section 24 converts coordinate data obtained from coordinate detector 22 into digital data, and compresses the digital data as data necessary for recognition. Recognition control section 24 constitutes a character processing section together with recognition dictionary 23, and is arranged as shown in FIG. 9. More specifically, coordinate data X and Y from coordinate detector 22 are input to analog switch (ASW) 71. CPU 72 receives pen up/down signal Z as status data. If signal Z represents a pen down state, X coordinate data is selected by ASW 71, and is supplied to A/D converter 73. A/D-converted n-bit data is supplied to CPU 72, and is stored in its internal register. Thereafter, ASW 71 is switched to select Y coordinate data, and CPU 72 similarly fetches n-bit data. A sampling cycle of the coordinate data at this time is set to be, e.g., 200 points/second, and the sampling operation is repeated until pen up/down signal represents a pen up state. In this case, a detected coordinate point density greatly varies in accordance with the moving speed of pen 38 moving along the tablet surface. For this reason, the detected coordinate data is written in coordinate memory 75 only when pen 38 is moved from the immediately preceding coordinates by predetermined values in the X and Y directions.

Recognition control section 24 extracts each character, and stores its feature point data in coordinate memory 75.

Figure 10:
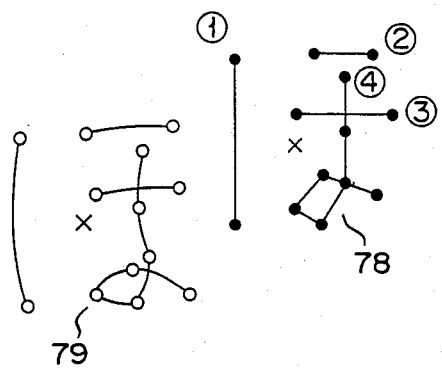
FIG. 10 is a representation for explaining the operation of the recognition control section shown in FIG. 9.

Recognition dictionary 23 stores standard patterns indicating coordinates of feature points of curves constituting a character. For example, if a hiragana character of standard pattern 78 is " " as shown in FIG. 10, feature point data indicated by black dots are stored in recognition dictionary 23 as position data. All the standard patterns as scanning objects are stored in units of blocks corresponding to individual characters. The number of feature points differs in accordance with the complexities of individual characters. For example, in FIG. 10, stroke (4) is more complex than strokes (1), (2), and (3). Therefore, strokes (1), (2), and (3) are expressed by two feature points, and stroke (4) is expressed by four feature points.

The same feature points of input pattern 79 as those of standard pattern 78 are extracted as indicated by white dots shown in FIG. 10, and preprocessing for normalizing a size of a position, and the like of a character is performed. Thereafter, the feature points of the two patterns are overlaid on the identical plane, and a category of the standard pattern which has the shortest distances between feature points of the standard pattern and the input pattern is stored in document memory 25 as the first candidate character of the input pattern.

Document memory 25 has a memory capacity of, e.g., 64 kbytes. This capacity corresponds to 64 pages of document data assuming that data of one A4-sized sheet requires about 1 kbyte upon document creation. Document memory 25 is backed up by rechargeable power supply 26.

CPU 72 of recognition control section 24 also has a function as a selection means for outputting A/D-converted X and Y coordinate data without modification in accordance with an external selection command. This selection is made by depressing soft switch 36 arranged on the lower left portion of casing 33 of apparatus 30 shown in FIG. 3.

Figure 11:
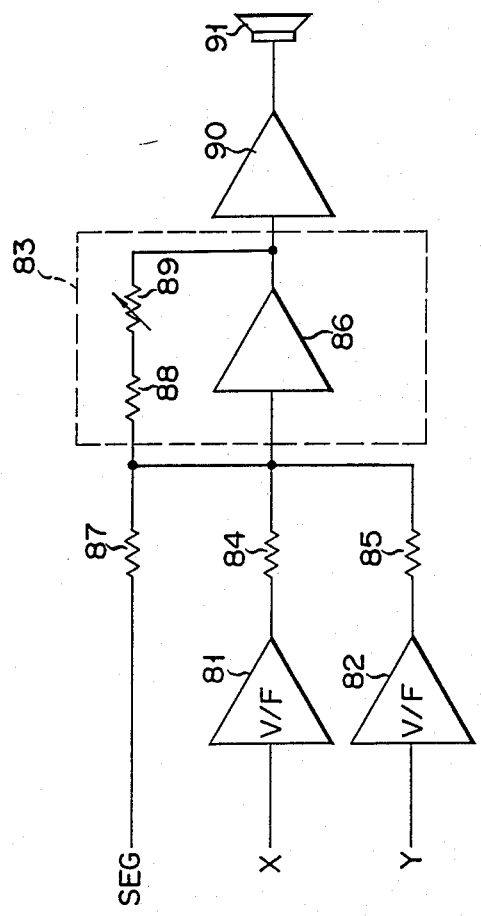
FIG. 11 is a detailed block diagram of a voice generator shown in FIG. 2.

Interface section 29 serially outputs character data or coordinate data selected by recognition control section 24 to apparatus 30 using, e.g., RS-232C cable 40. The data can be parallel-output using a Centronics interface. Since interface section 29 employs a memory mapped I/O structure, document data transfer to the host side can be further facilitated. FIG. 11 shows the arrangement of voice generator 28. X and Y coordinate data generated by pressing tablet 21 are voltage/frequency-converted by V/F converters 81 and 82, respectively, and are added to each other through weighting resistors 84 and 85 of weighting adder circuit 83. The sum data is then input to amplifier 86. Segment signal Seg obtained upon character segmentation is supplied from CPU 72 of recognition control section 24, and is input to weighting adder circuit 83 through weighting resistor 87 whose resistance is larger than those of weighting resistors 84 and 85. Weighting adder circuit 83 is constituted by connecting fixed resistor 88 and variable resistor 89 as feedback resistors to amplifier 86, and its gain can be controlled by variable resistor 89. An output from circuit 83 is amplified by power amplifier 90, and is supplied to loudspeaker 91.

In the data input apparatus having the above arrangement, when a character is to be input, a character input mode is selected using soft switch 36, and characters can be handwritten on the detection surface of tablet 21 one by one. Thus, recognition results of the handwritten characters can be stored in document memory 25. The stored character data can be stably held in document memory 25 which is backed up by power supply 26.

When character data displayed on display 13 of apparatus 20 is to be corrected, soft switch 36 of apparatus 30 is switched to a mode where coordinate data from coordinate detector 22 is used without modification. In this mode, a cursor can be displayed at a position on display unit 13 corresponding to the pressed position on tablet 21.

Therefore, if an item setting means for instructing, e.g, insertion, deletion, correction, and the like, is arranged on the detection surface of tablet 21 or on a predetermined position of other apparatus 30, a correcting operation can be performed by operating only tablet 21. Therefore, the correcting operation can be facilitated as compared with a conventional method wherein the correcting operation is performed while operating both tablet 21 and keyboard 12.

The present invention is not limited to the above embodiment. For example, as shown in FIG. 12, data input apparatus 30 can be provided with a simple post processing function, so that input abbreviated data such as item names, item codes, addresses, and the like, can be substituted with word data prestored in word dictionary 96 by post processing section 95. Then, the word data can be stored in document memory 25. With this arrangement, the document data input operation can be simplified.

The memory capacity of document memory 25 and the type of characters as a recognition object of recognition control section 24 can be determined in accordance with their specifications. The present invention is not limited as to the types of warning displays. The size of the character input area can be modified in accordance with character recognition precision or each writer, so that a plurality of lines of character data can be input.

The document memory can comprise a magnetic disk, an IC card, and the like. The character processing section can be one that recognizes a character to write a category of the recognized character in the document memory and can be one that stores compressed coordinate data obtained by compressing time-serially input coordinate data in the document memory as character data. In this case, character recognition is performed at the host side.

In the tablet detection surface, the entire coordinate detector can be a detection area for one character.

What is claimed is:

1. A handheld data input apparatus comprising:
   a pressure-sensitive tablet;
   a character recognition means for recognizing handwritten character data input through said tablet;
   a document memory, connected to said character recognition means, for storing a recognition result from said character recognition means;
   a power supply for supplying power to said tablet, said character recognition means, and said document memory; and
   a casing integrally incorporated said tablet, said character recognition means, said document memory, and said power supply; and
   wherein said handheld data input apparatus is arranged to be connected to a document data processing apparatus main body via an external interface means, and when said handheld data input apparatus is connected to said document data processing apparatus main body, said character recognition means can supply document data from said document memory to said document data processing apparatus main body.

2. An apparatus according to claim 1, wherein said tablet comprises:
   a pressure-sensitive tablet mechanism consisting of a pair of transparent films;
   a coordinate detector for detecting a coordinate position corresponding to a pressed position of said pressure-sensitive tablet mechanism;
   a flat display integrally stacked on a lower portion of said pressure-sensitive tablet mechanism; and
   a display control means for controlling a data display of said flat display.

3. An apparatus according to claim 2, wherein said flat display has the same coordinate system as that of said pressure-sensitive tablet mechanism, and said display control means displays, on said flat display, a character data input area on said pressure-sensitive tablet mechanism for the handwritten character data input through said pressure-sensitive tablet mechanism and a handwritten-character data pattern input through said pressure-sensitive tablet mechanism.

4. An apparatus according to claim 3, wherein said display control means displays, on said flat display, the character data input area which can vary.

5. An apparatus according to claim 2, wherein said flat display comprises a liquid-crystal display.

6. An apparatus according to claim 2, wherein said display control means comprises:
   a character area data input means for supplying size data of externally input handwritten character data to a control means main body;
   a control means main body for receiving the size data of a character supplied from said character area data input means, and causing said flat display to display a character frame specifying a character input area or a scale serving as a guide for a character input operation;
   a handwriting input means for displaying, in real time, handwriting data, which is handwritten within the character input area and is detected by said coordinate detector, as a handwriting pattern;
   a power supply monitor for checking if a voltage of said power supply has decreased below a predetermined level, and if it has decreased below the predetermined level, for causing said flat display to display a first message indicating such; and
   a memory capacity monitor for checking the number of input character data stored in said document memory, and if a remaining number of character data for storage is decreased, for causing said flat display to display a second message, indicating such.

7. An apparatus according to claim 6, further including a loudspeaker for outputting a warning sound when said power supply monitor and said memory capacity monitor cause said flat display to display either first or second message.

8. An apparatus according to claim 1, wherein said document data processing apparatus main body is assigned to a plurality of handheld data input apparatuses.

9. An apparatus according to claim 1, wherein said casing has a connecting terminal for receiving an interface connector which externally connects to said handheld data input apparatus to a document data processing apparatus main body.

10. An apparatus according to claim 1, wherein said power supply is a rechargeable direct current power supply.

11. An apparatus according to claim 8, wherein said casing has a connecting terminal for charging said power supply.

12. An apparatus according to claim 1, wherein said casing has a loudspeaker for producing a warning sound during a character data input operation.

13. An apparatus according to claim 1, wherein said tablet has a predetermined coordinate position detection precision and comprises:
   a pressure-sensitive tablet mechanism which comprises:
      an upper film having a transparent resistor film deposited on a lower surface of a polymer material base, and conductive electrodes arranged thereon,
      a lower film having a transparent resistor film deposited on an upper surface of a polymer material base, and conductive electrode arranged thereon, and
      a spacer sandwiched between said upper and lower films, to separate said upper and lower films; and
   a liquid-crystal display arranged on the lower surface of said lower film.

14. An apparatus according to claim 13, wherein data displayed on said liquid-crystal display is read through said pressure-sensitive tablet mechanism.

15. An apparatus according to claim 13, wherein said liquid-crystal display is designed so that the size of each display pixel and the pixel density of said liquid-crystal display are substantially equal to the coordinate position detection precision of said pressure-sensitive tablet mechanism.

16. An apparatus according to claim 13, wherein data of a character input area including a character input frame and a scale indicating a character input position is displayed on said liquid-crystal display.

17. An apparatus according to claim 13, wherein said liquid-crystal display displays handwriting data of a handwritten character pattern input through said pressure sensitive tablet mechanism, in real time in the same coordinate system.

18. An apparatus according to claim 1, further comprising:
   a word dictionary for storing word data in correspondence with abbreviations; and
   a post-processing means for converting abbreviation data input through said tablet into word data, with reference to said word dictionary, and storing the word data in said document memory 19. A handheld data input apparatus comprising:
   a pressure-sensitive tablet;
   a coordinate detector for receiving a signal output from said tablet and outputting coordinate data corresponding to a pressed position on a detection surface of said tablet;
   a character processing means for extracting predetermined character data from time-serial coordinate data output from said coordinate detector;
   a document memory for sequentially storing the character data extracted by said character processing means;

selection means for selecting the character data stored in said document memory or coordinate data from said coordinate detector;

an interface means for outputting the character data or the coordinate data selected by said selection means to a host apparatus connected to said handheld data input apparatus; and a casing integrally incorporating said tablet, said coordinate detector, said character processing means, said document memory, said selection means, and said interface means.

20. An apparatus according to claim 19, wherein said character processing means comprises:

a recognition dictionary for storing standard patterns corresponding to individual characters; and a recognition control means for accessing said recognition dictionary, based on the coordinate data from said coordinate detector, to recognize a corresponding character.

21. An apparatus according to claim 20, wherein said recognition control means further comprises:

a coordinate memory;

the coordinate data output from said coordinate detector comprises X and Y coordinates; and said recognition control means compares the current X and Y coordinates outputted from said coordinate detector with the X and Y coordinates previously outputted from said coordinate detector, and stores the current X and Y coordinates into said coordinate memory as updated coordinates only when the difference between the current X and Y coordinates and the previous X and Y coordinates exceeds a predetermined value.

22. An apparatus according to claim 20, wherein said apparatus further includes a voice generator for generating a sound of a frequency corresponding to a pressed position on the detection surface of said tablet.

23. An apparatus according to claim 19, wherein said coordinate detector outputs X and Y coordinates of a pressing point of a pen on said tablet, and outputs a pen-up/down signal.

24. An apparatus according to claim 23, wherein said character processing means includes a voice generator for discriminating segmentations of the handwritten input character, in accordance with the pen-up/down signal, for outputting a signal indicating a division of a single character when a period during which a pen-up state is kept exceeds a predetermined value, and generating a sound of a frequency corresponding to a signal corresponding to a pressed position of said tablet, said voice generator outputting a sound of a frequency different from that of the sound indicating the pressed position coordinates, in response to the signal indicating the division of the single character.

25. An apparatus according to claim 19, wherein item-setting means for instructing at least insertion, deletion, correction being arranged on a given position of the detection surface of said tablet.

26. An apparatus according to claim 19, wherein the entire coordinate detection surface of said tablet serves as a detection area for one character.

27. An apparatus according to claim 19, further comprising a battery having a recharging function, said document memory comprising a programmable permanent memory, of a battery back-up type.

28. An apparatus according to claim 19, wherein said document memory comprises a magnetic disk.

29. An apparatus according to claim 19, wherein said document memory is formed in an integrated circuit card.

30. An apparatus according to claim 29, wherein said apparatus further includes instruction means for instructing whether character data or coordinate data is to be output from said recognition control means.

31. An apparatus according to claim 30, wherein said recognition control means outputs, to a document data processing apparatus which is externally connected to said handheld data input apparatus via said interface means, coordinate data when said instruction means instructs output of the coordinate data, and character data when said instruction means instructs output of the character data.

32. An apparatus according to claim 31, wherein said recognition control means stores compressed coordinate data obtained by compressing the coordinate data in said document memory.

* * * * *